(12) United States Patent
Yoshida

(10) Patent No.: US 8,562,068 B2
(45) Date of Patent: Oct. 22, 2013

(54) VEHICLE FRAMEWORK MEMBER

(75) Inventor: Koji Yoshida, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/375,600

(22) PCT Filed: Mar. 2, 2010

(86) PCT No.: PCT/JP2010/053340
§ 371 (c)(1),
(2), (4) Date: Dec. 1, 2011

(87) PCT Pub. No.: WO2011/108078
PCT Pub. Date: Sep. 9, 2011

(65) Prior Publication Data
US 2012/0074732 A1 Mar. 29, 2012

(51) Int. Cl.
*B62D 25/00* (2006.01)

(52) U.S. Cl.
USPC ............ 296/187.03; 296/187.11; 296/187.09; 296/187.12

(58) Field of Classification Search
USPC .............. 296/187.03, 187.09, 187.1, 187.11, 296/187.12
See application file for complete search history.

(56) References Cited

U.S. PATENT DOCUMENTS

| | | | | |
|---|---|---|---|---|
| 6,899,195 | B2 * | 5/2005 | Miyasaka | 180/312 |
| 7,104,597 | B2 * | 9/2006 | Osato et al. | 296/203.04 |
| 7,703,805 | B2 * | 4/2010 | Sasaki et al. | 280/784 |
| 7,887,123 | B2 * | 2/2011 | Honji et al. | 296/187.09 |
| 2004/0200659 | A1 | 10/2004 | Miyasaka | |

FOREIGN PATENT DOCUMENTS

| | | |
|---|---|---|
| JP | 57 74877 | 5/1982 |
| JP | 05 024558 | 2/1993 |
| JP | 2003 054452 | 2/2003 |
| JP | 2003 226266 | 8/2003 |
| JP | 2008 062760 | 3/2008 |

OTHER PUBLICATIONS

International Search Report Issued Apr. 20, 2010 in PCT/JP10/053340 Filed Mar. 2, 2010.

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

When front side members are bent by a front-rear-directional collision of a vehicle, the front side members come in surface, not point, contact with an adjacent member in the vehicle by a contact surface formed at a contact portion. Accordingly, the front-rear-directional collision load is stably transmitted to a member, such as an adjacent engine, such that it is possible to efficiently improve the effect of distributing and reducing the load in a collision. Further, since the bent front side members stably come in surface, not point, contact with the adjacent member, such as the engine in the vehicle, it is possible to decrease the possibility of unexpected fracturing of the front side members.

10 Claims, 16 Drawing Sheets

VEHICLE FRAMEWORK MEMBER

TECHNICAL FIELD

The present invention relates to a vehicle framework member that constitutes the frame of a vehicle.

BACKGROUND ART

Various vehicle framework members that form the frame of a vehicle have been proposed taking strength into consideration. For example, in Patent Literature 1, for a member for a vehicle which combines a front side member with an extension member, a vehicle framework structure having a bending portion inclined smoothly downward from the rear portion of the front side member to the extension member is disclosed. Reinforcing beads are continuously formed at the side extending from the front side member, which is the straight portion of the member for a vehicle, to the bending portion. Therefore, in the structure of Patent Literature 1, the weight of the vehicle is reduced by improving the cross-sectional strength of the bending portion and increasing the bending rigidity of the member for a vehicle.

CITATION LIST

Patent Literature

[Patent Literature 1] Japanese Unexamined Patent Application Publication No. 2008-62760

SUMMARY OF INVENTION

Technical Problem

However, in the technology described above, although deformation is suppressed by increasing the cross-sectional strength or the bending rigidity, it is not considered how the member transmits load after deformation, when large load is transmitted and the member is deformed in a collision. In this technology, it is difficult to estimate how the member deforms when a load is applied in a collision. Therefore, the transmission of load is unstable in a collision in the technology. Accordingly, it is insufficient to absorb shock or prevent fracturing of the member in a collision in the technology.

The present invention has been made in consideration of such circumstances and an object thereof is to provide a vehicle framework member that can reduce load that is applied to a vehicle in a collision.

Solution to Problem

A vehicle framework member that forms the frame of a vehicle, has a contact portion where a contact surface, which comes in contact with an adjacent member in the vehicle when the vehicle framework member is bent by load, is formed.

According to this configuration, a contact surface, which comes in contact with an adjacent member in the vehicle when the vehicle framework member is bent by load in a collision, is formed at the contact portion of the vehicle framework member that forms the frame of the vehicle. Therefore, the bent vehicle framework member comes in surface, not point, contact with an adjacent member in the vehicle, such that the load due to a collision is stably transmitted by the adjacent member and it is possible to efficiently improve the effect of distributing and reducing the load in a collision. Further, as the bent vehicle framework member stably comes in surface, not point, contact with an adjacent member in the vehicle, it is possible to decrease the possibility of unexpected fracturing of the vehicle framework member.

In this case, a contact surface, which takes the shape of an adjacent member in the vehicle when the vehicle framework member is deformed by load, may be formed at the contact portion.

According to this configuration, a contact surface, which takes the shape of an adjacent member in the vehicle when the vehicle framework member is deformed by load, is formed at the contact portion. Therefore, the deformed vehicle framework member comes in contact with a contact surface along the shape of an adjacent member in the vehicle, such that the load due to a collision is further stably transmitted to the adjacent member and it is possible to further efficiently improve the effect of distributing and reducing the load in a collision.

Further, the vehicle framework member may be a side member that extends in the front-rear direction of the vehicle at the sides edges of the vehicle.

According to this configuration, the vehicle framework member is a side member that extends in the front-rear direction of the vehicle at the sides edges of the vehicle. Therefore, when the side member is bent by a front-rear-directional collision of the vehicle, the side member comes in surface, not point, contact with an adjacent member in the vehicle, such that the load due to the front-rear-directional collision is stably transmitted by the adjacent member and that it is possible to efficiently improve the effect of distributing and reducing the load in a collision. Further, as the bent side member stably comes in surface, not point, contact with an adjacent member in the vehicle, it is possible to decrease the possibility of unexpected fracturing of the side member.

Further, the contact surface, which is a flat surface coming in contact with an engine of the vehicle when the vehicle framework member is bent by load, may be formed at the contact portion.

According to this configuration, the contact surface, which is a flat surface coming in contact with an engine of the vehicle when the vehicle framework member is bent by load, is formed at the contact portion. Therefore, as the load in a collision is stably transmitted to the engine that is hard and large in mass, it is possible to further efficiently improve the effect of distributing and reducing the load in a collision.

Further, the contact surface, which is a curved surface coming in contact with a cylindrical suspension member that suspends a wheel of the vehicle when the vehicle framework member is bent by load, may be formed at the contact portion.

According to this configuration, the contact surface, which is a curved surface coming in contact with a cylindrical suspension member suspending a wheel of the vehicle when the vehicle framework member is bent by load, is formed at the contact portion. Therefore, load due to a collision is stably transmitted to the suspension member having high strength in order to suspend a wheel of the vehicle, such that it is possible to improve the effect of distributing and reducing the load in a collision.

Further, the contact portion may be a plate of the surface of the vehicle framework member, the plate may be recessed inward from the vehicle framework member along a polygonal-curved line in a normal state, and the plate may protrude outward from the vehicle framework member along the polygonal-curved line and the contact surface may be formed when the vehicle framework member is bent by load.

According to this configuration, the contact portion is a plate on the surface of the vehicle framework member. The plate is recessed inward from the vehicle framework member along a polygonal-curved line in a normal state, and the plate protrudes outward from the vehicle framework member along the polygonal-curved line and the contact surface is formed when the vehicle framework member is bent by load. Therefore, the contact portion where the contact surface is formed can be surely implemented in a simple structure.

Further, the contact portion may be a contact member provided on the surface of the vehicle framework member, the contact member may be folded in a normal state, and the contact member is developed and the contact surface may be formed when the vehicle framework member is bent by load.

According to this configuration, the contact portion is a contact member provided on the surface of the vehicle framework member. The contact member is folded in a normal state, and the contact member is developed and the contact surface is formed when the vehicle framework member is bent by load. Therefore, the contact portion where the contact surface is surely formed can be implemented in a simple structure.

Advantageous Effects of Invention

According to a vehicle framework member of the present invention, it is possible to efficiently improve the effect of distributing and reducing the load in a collision. Further, it is possible to decrease the possibility of unexpected fracturing of the vehicle framework member.

DESCRIPTION OF EMBODIMENTS

Figure 1:
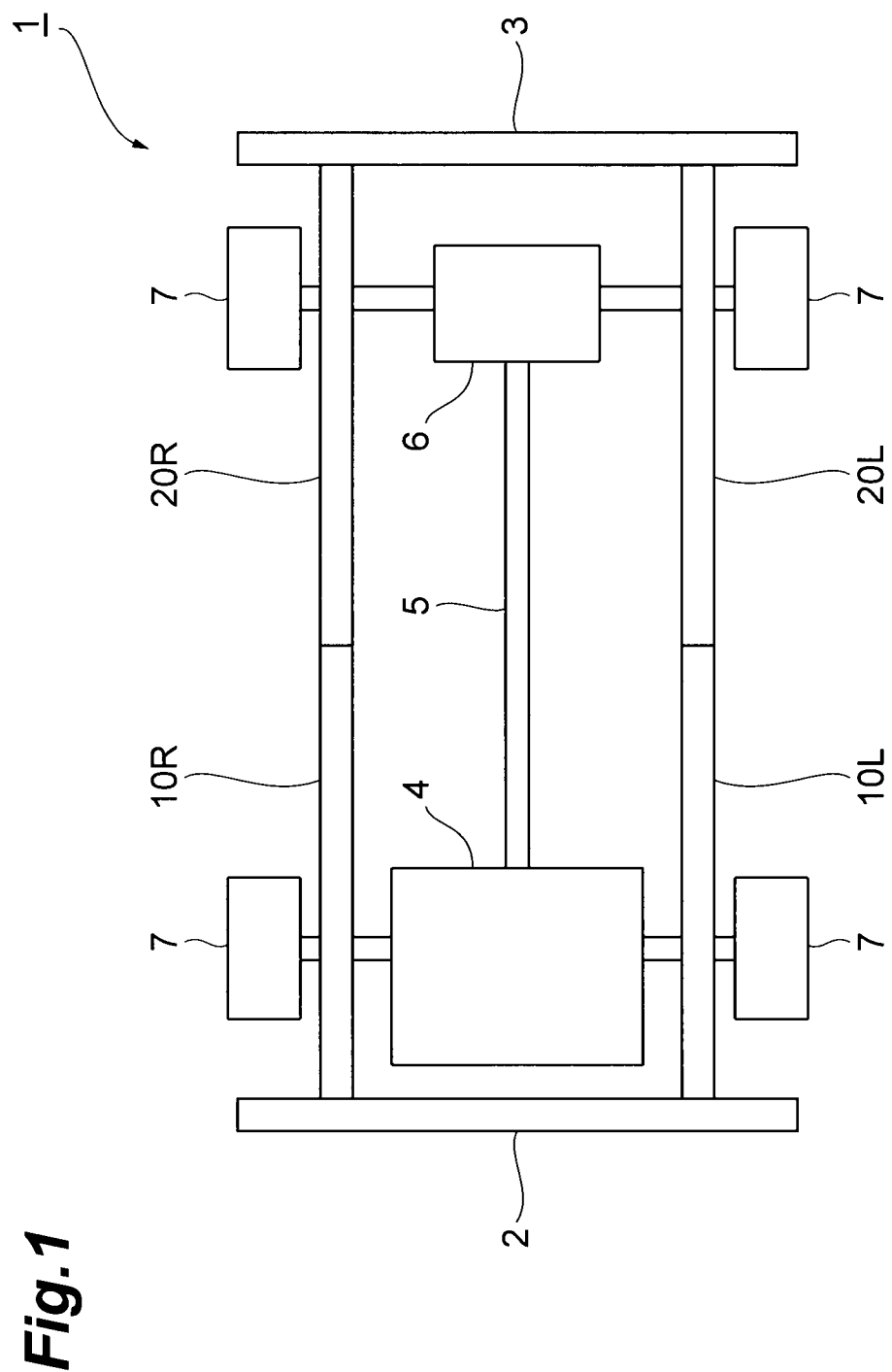
FIG. 1 is a plan view showing a vehicle framework structure according to a first embodiment.

Hereinafter, embodiments of the present invention are described with reference to the drawings. In the following first embodiment, an example of applying a vehicle framework member of the present invention to a front side member that forms the frame of the sides edges of the front portion of the vehicle is described. As shown in FIG. 1, a vehicle framework structure 1 according to the embodiment includes a front bumper reinforcement 2, a rear bumper reinforcement 3, front side members 10L and 10R, and rear side members 20L and 20R. The front bumper reinforcement 2 forms the structure of the front of a vehicle. The front side members 10L and 10R form the structure of the sides edges of the front portion of a vehicle. The rear side members 20L and 20R form the structure of the sides edges of the rear portion of a vehicle. The rear bumper reinforcement 3 forms the structure of the rear of a vehicle.

An engine 4 is mounted at the front portion of a vehicle. A propeller shaft 5 that transmits the driving force of the engine 4 extends from the engine 4 to the rear portion of a vehicle through a transmission (not shown). The propeller shaft 5 is connected to a differential gear 6 at the rear portion of the vehicle. The vehicle is equipped with four tires 7. The two rear tires 7 are driven by a driving force transmitted to the differential gear 6.

Figure 2:
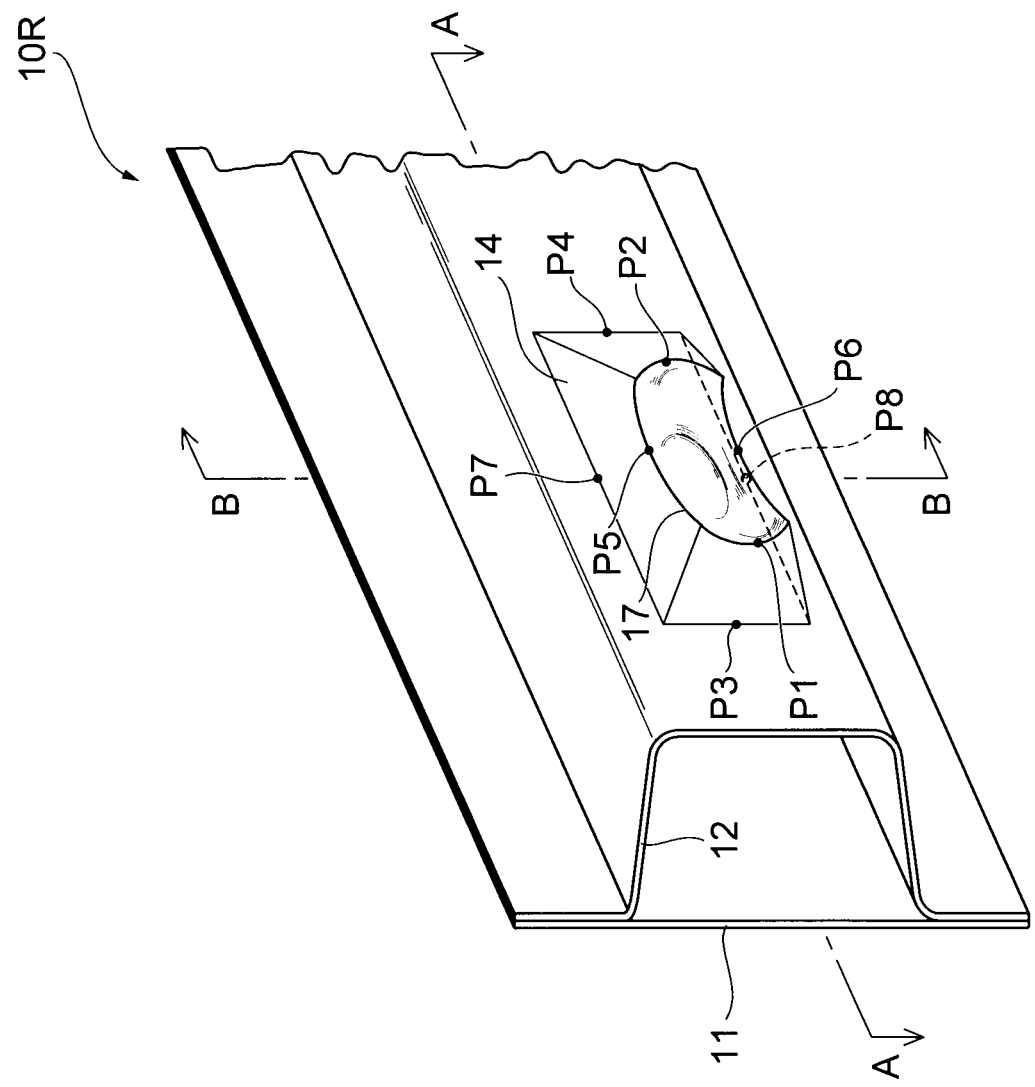
FIG. 2 is a perspective view showing a front side member according to the first embodiment.

As shown in FIG. 2, the right front side member 10R seen from the center portion of a vehicle to the outside of the vehicle is described. The front side member 10R is implemented by combining a flat steel member 11 outside the vehicle and a hat-shaped steel member 12 inside the vehicle. A contact portion 14 is formed at the hat-shaped steel member 12, in the range from the front end to the rear end of the engine 4. The contact portion 14 allows the hat-shaped steel member 12 to be recessed inside the front side member 10R by a polygonal-curved portion 17

The front side member 10R around the contact portion 14 is different in plate thickness, material, and shape from the other portions. Therefore, the front side member 10R around the contact portion 14 is smaller in cross-sectional rigidity and weaker than other portions, such that it is easily bent by front-rear-directional load.

Figure 3:
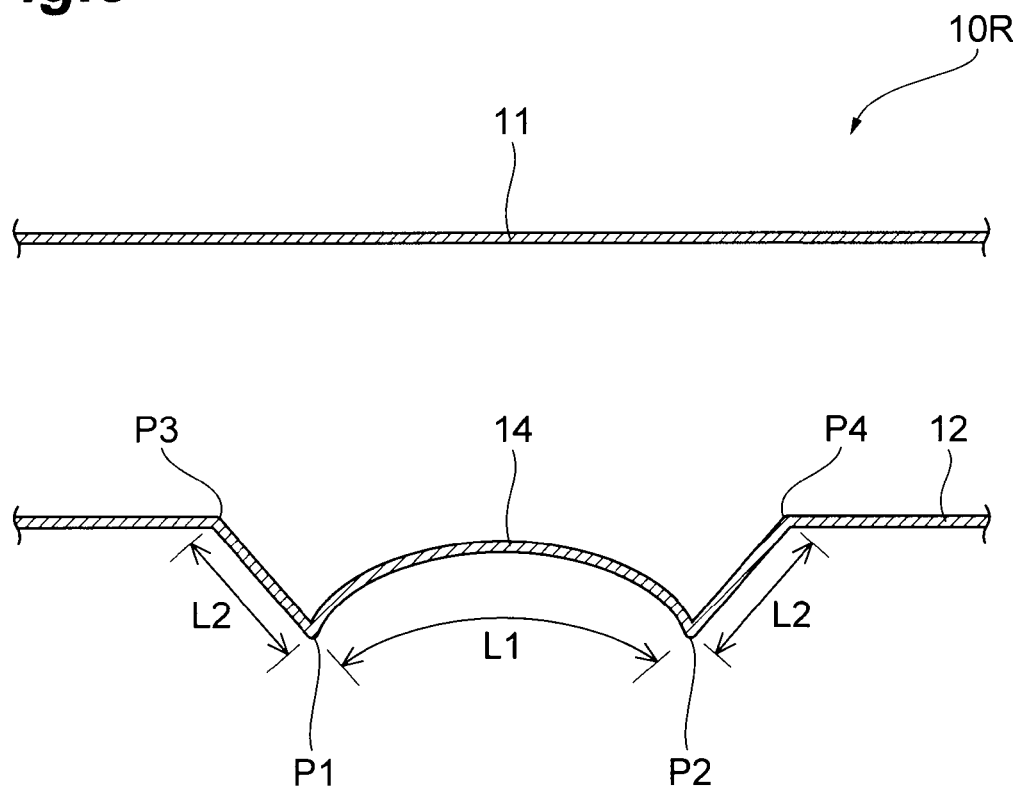
FIG. 3 is a cross-sectional view taken along the line A-A in FIG. 2.
Figure 4:
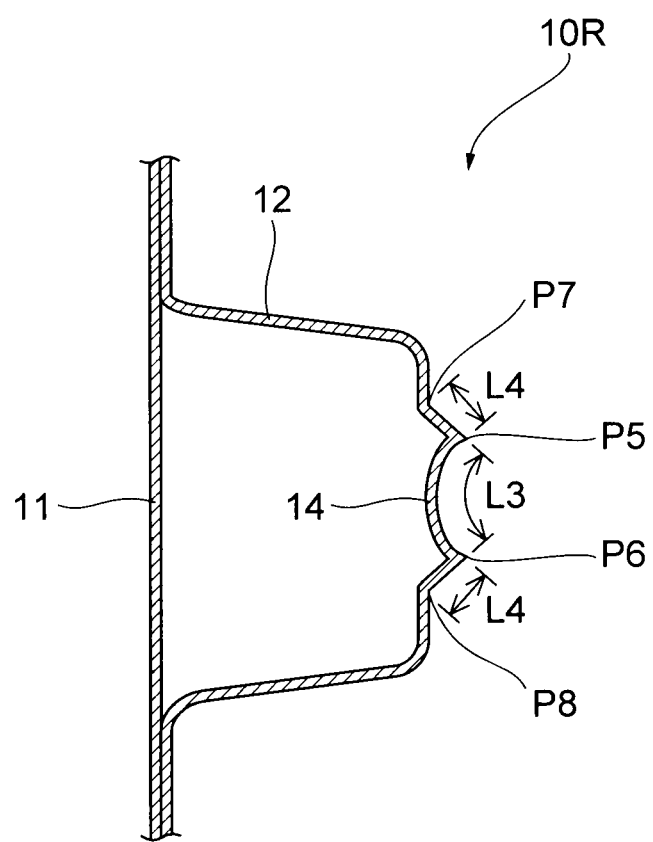
FIG. 4 is a cross-sectional view taken along the line B-B in FIG. 2.

As shown in FIG. 3 that is a cross-sectional view taken along the line A-A in FIG. 2 and FIG. 4 that is a cross-sectional view taken along the line B-B in FIG. 2, in the contact portion 14, the hat-shaped steel member 12 bends outward from the front side member 10R, at the polygonal-curved portion 17 connecting the points P3, P4, P7, and P8. Meanwhile, in the contact portion 14, the hat-shaped steel member 12 bends inward from the front side member 10R, at the polygonal-curved portion 17 connecting the points P1, P2, P5, and P6. The distance between the points P1 and P2 is L1. The distance between the point P1 to P3 and the distance between the point P2 and P4 are L2. The distance between the points P5 and P6 is L3. The distance between the points P5 and P37 and the distance between the points P6 and P8 are L4.

Figure 5:
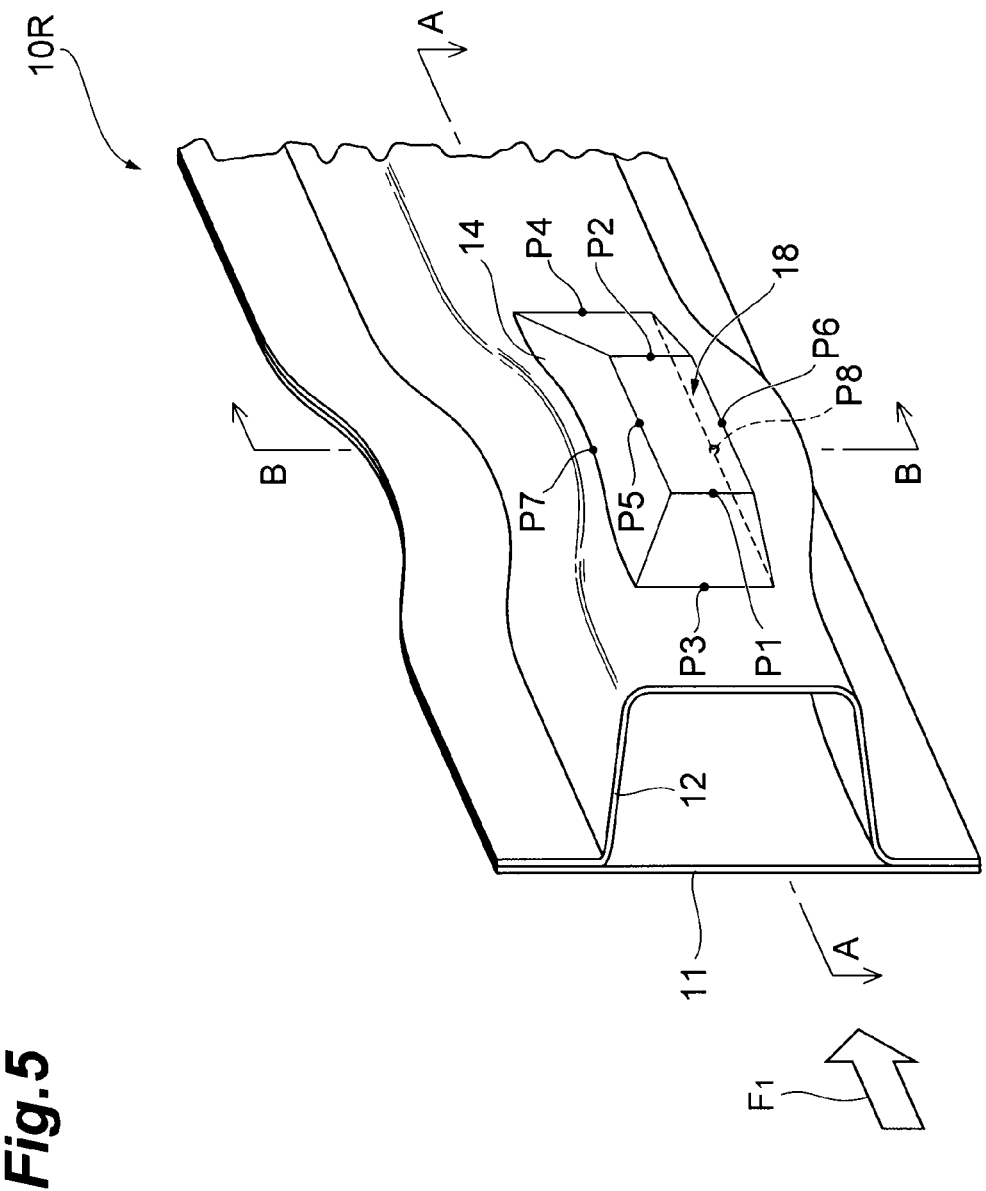
FIG. 5 is a perspective view showing a state in a collision of FIG. 2.

Hereafter, the operation of the front side member 10R according to the embodiment is described. As shown in FIG. 5, when load $F_1$ is transmitted from the front of a vehicle by a collision at the front of the vehicle, the front side member 10R bends inside the vehicle around the contact portion 14. Tension is applied to the hat-shaped steel member 12 at the outside of the bending, such that the contact portion 14 protrudes outward from the front side member 10R and a contact surface 18 is formed.

Figure 6:
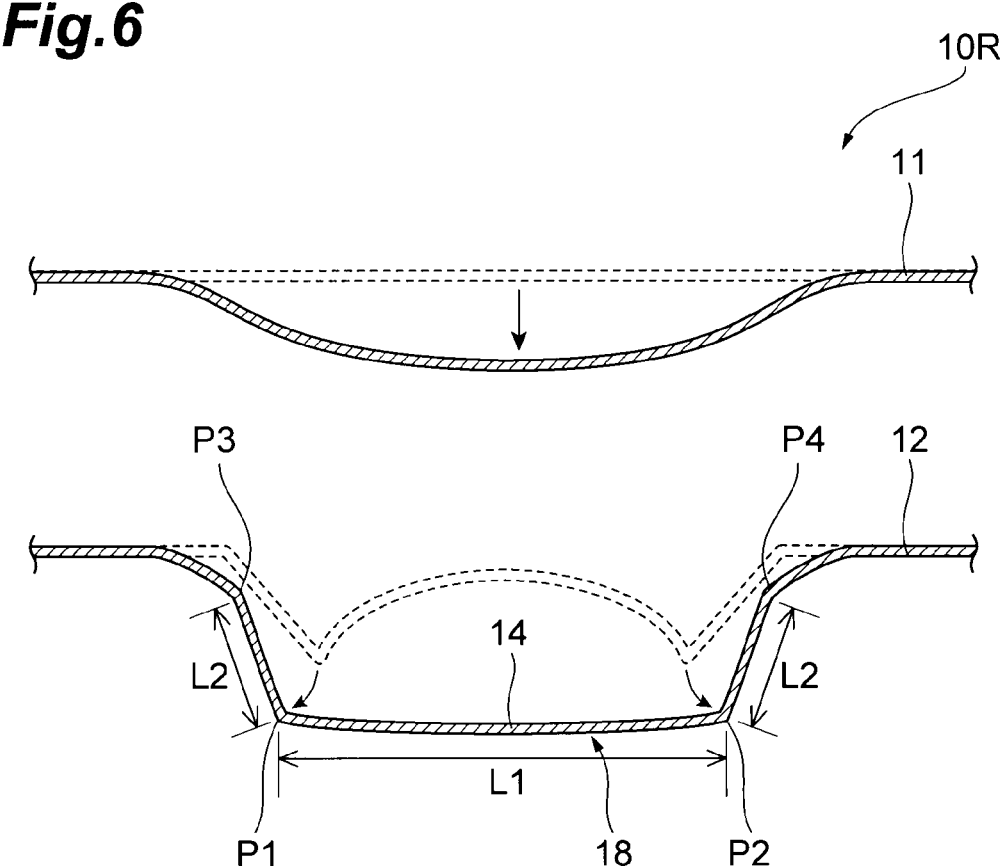
FIG. 6 is a cross-sectional view showing a state in a collision of FIG. 3.
Figure 7:
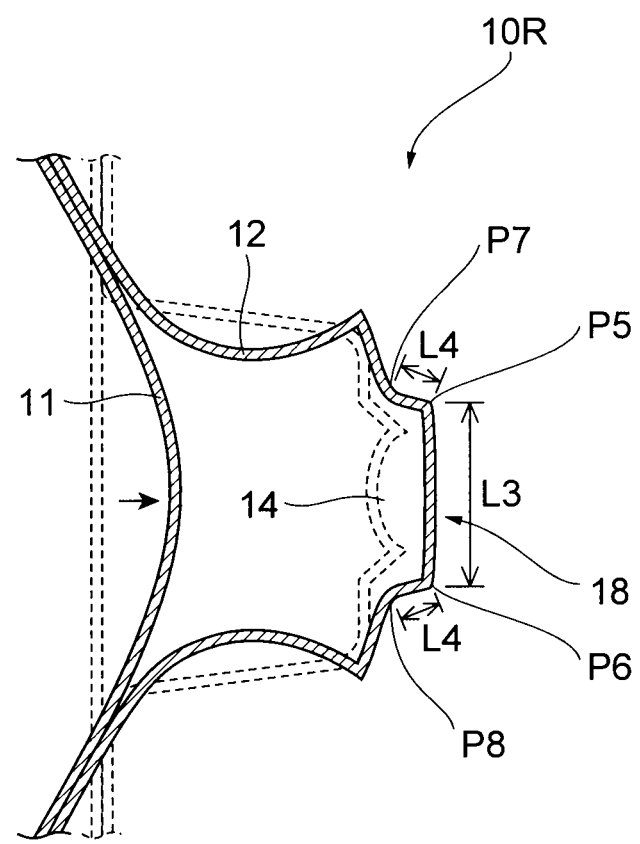
FIG. 7 is a cross-sectional view showing a state in a collision of FIG. 4.

The formed contact surface 18 is a substantially flat surface, as shown in FIG. 6 that is a cross-sectional view taken along the line A-A in FIG. 5 and FIG. 7 that is a cross-sectional view taken along the line B-B in FIG. 2. Even though the contact surface 18 protrudes, the distance between the points P1 and P2 is maintained at L1, the distance between the points P1 and P3 and the distance between the points P2 and P4 at L2, the distance between the points P5 and P6 at L3, and the distance between the points P5 and P37 and the distance between the points P6 and P8 at L4. The front side member 10L at the opposite side operates in the same way.

Figure 8:
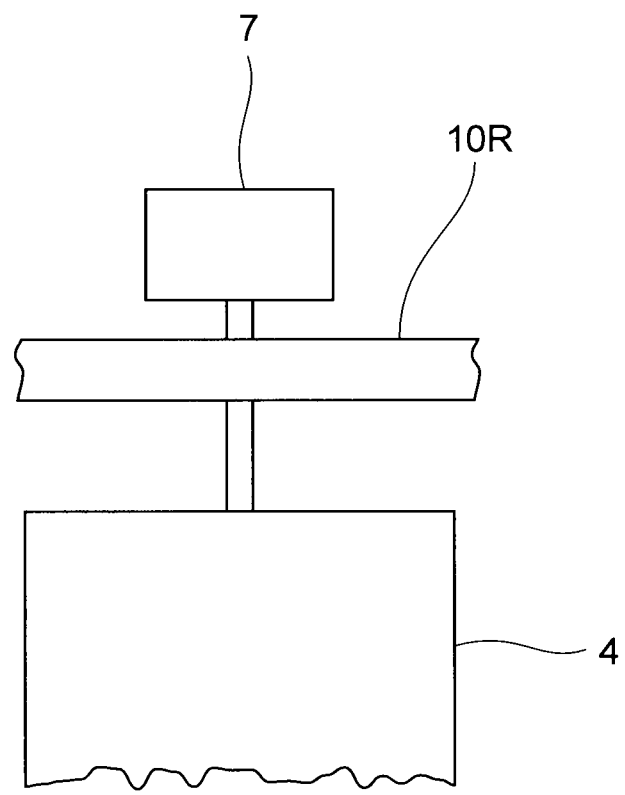
FIG. 8 is a plan view showing a front side member of the related art in a normal state.
Figure 9:
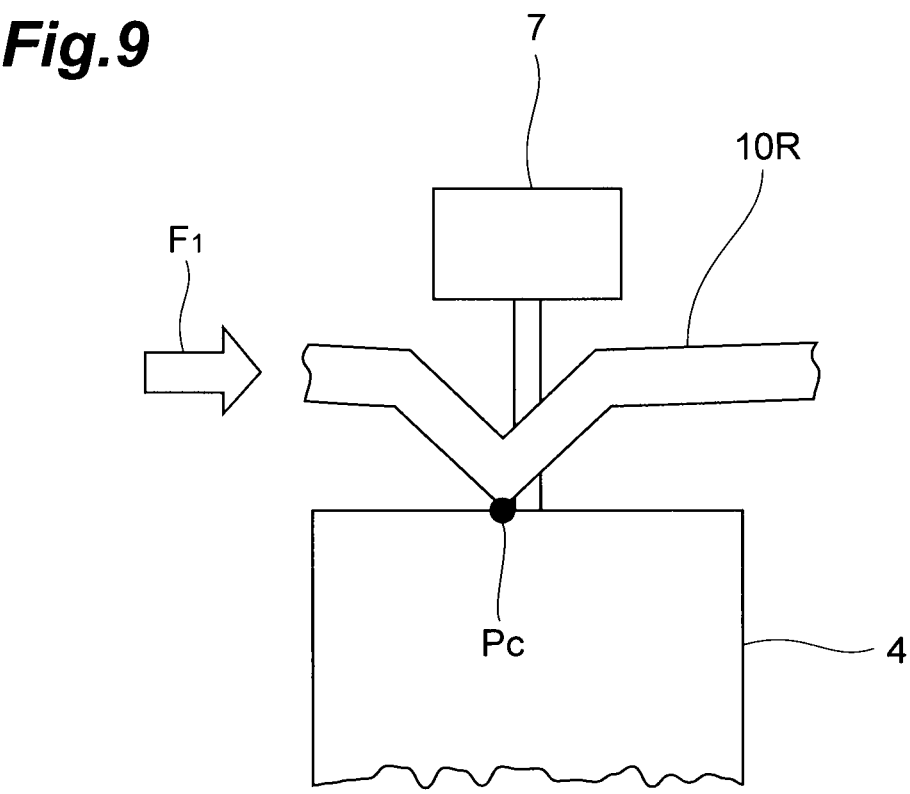
FIG. 9 is a plan view showing a state in a collision of FIG. 8.
Figure 10:
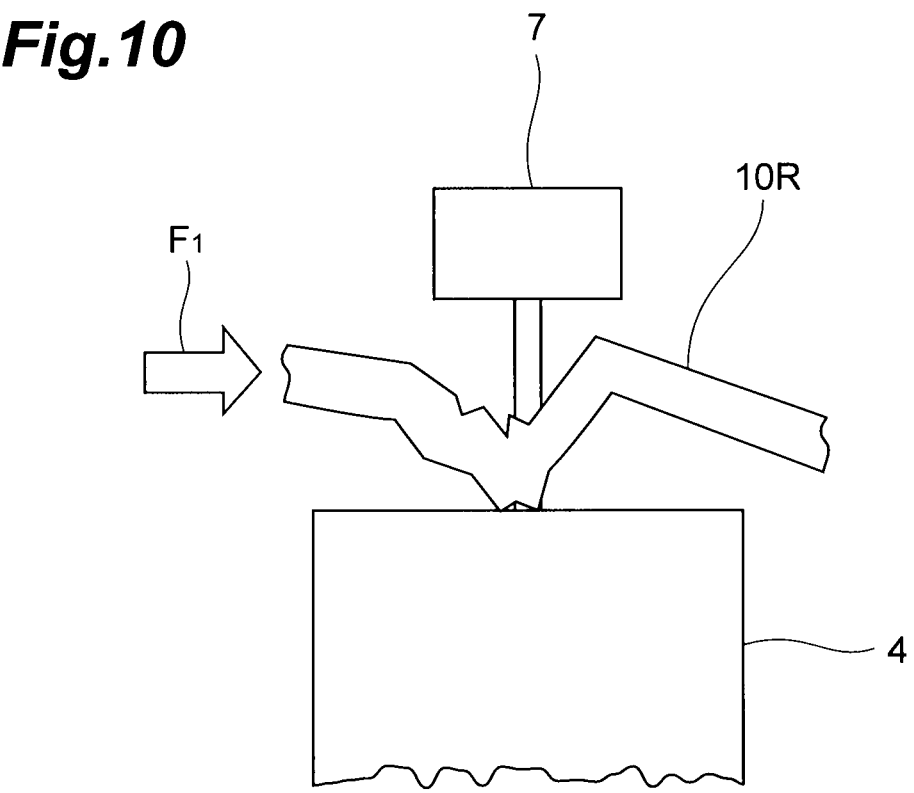
FIG. 10 is a plan view showing a state after the collision of FIG. 9.

In the front side member 10R of the related art shown in FIG. 8, as shown in FIG. 9, when load $F_1$ is transmitted from the front of the vehicle by a collision, the bent front side member 10R comes in point contact with a member inside the vehicle, such as the adjacent engine 4, at the contact point Pc. As a result, as shown in FIG. 10, the cross-section of the front side member 10R is broken and the contact between the bent front side member 10R and the engine 4 becomes unstable. Therefore, the transmission of the load $F_1$ from the front side member 10R to the engine 4 becomes unstable.

Figure 11:
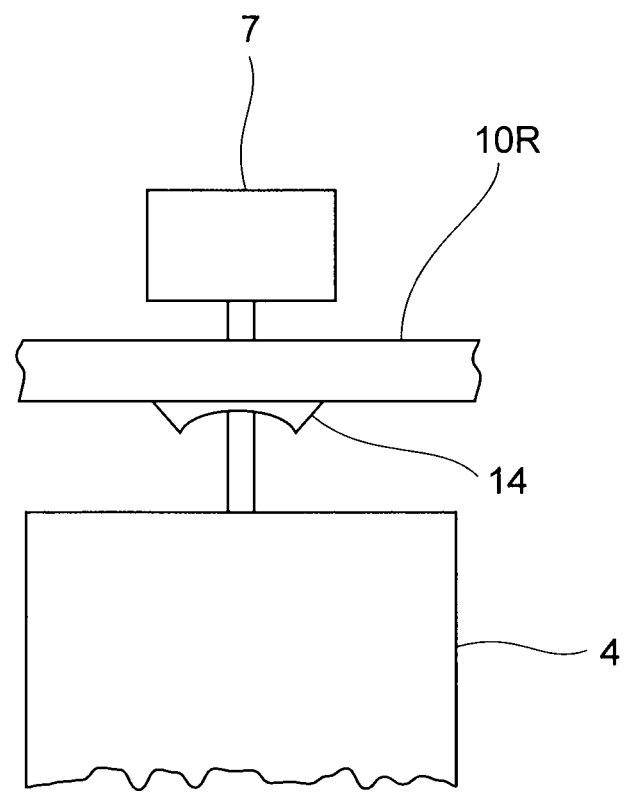
FIG. 11 is a plan view showing a front side member of the first embodiment in a normal state.
Figure 12:
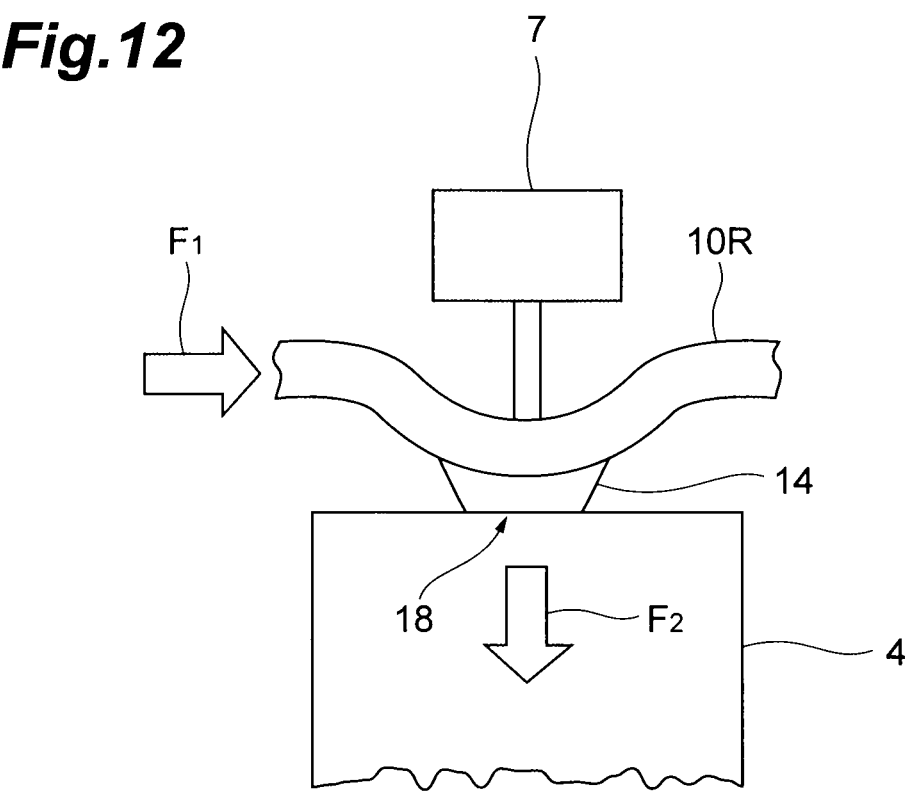
FIG. 12 is a plan view showing a state in a collision of FIG. 11.

On the other hand, in the front side member 10R according to the embodiment shown in FIG. 11, as shown in FIG. 12, when load $F_1$ is transmitted from the front of the vehicle by a collision, the bent front side member 10R comes in surface contact with a member inside the vehicle, such as the adjacent engine 4, at the contact surface 18 formed at the contact portion 14. As a result, the contact between the bent front side member 10R and the engine 4 becomes unstable. Therefore, load $F_2$ that is a portion of the load $F_1$ from the front side member 10R is stably transmitted to the engine 4. Further, the amount of bending of the front side members 10L and 10R is set such that the distance changing until the front side members 10L and 10R come in contact with the adjacent member, such as the engine 4, after the front side member 10L and 10R bend.

Further, when the shape of the member, such as the engine 4 of the vehicle, around the contact portion 14 is not a simple flat surface, a concave-convex portion that allows the shapes of the front side member 10R and the contact portion 14 after the deformation due to the load $F_1$ to fit to the shape of the engine 4 before the deformation can be formed.

According to the embodiment, since the front side members 10L and 10R are in surface, not point, contact with the adjacent member in the vehicle by the contact surface 18 formed at the contact portion 14, when the front side members 10L and 10R are bent by a front-rear-directional collision of the vehicle, the load due to a front-rear-directional collision is stably transmitted to the adjacent member, such as the engine 4, such that it is possible to efficiently improve the effect of distributing and reducing the load in a collision. Further, since the bent front side members 10L and 10R stably come in surface, not point, contact with the adjacent member, such as the engine 4 in the vehicle, it is possible to decrease the possibility of unexpected fracturing of the front side members 10L and 10R.

Further, according to the embodiment, the contact surface 18 that takes the shape of the adjacent engine 4 in the vehicle when the front side members 10L and 10R are bent by load is formed at the contact portion 14. Accordingly, the bent front side members 10L and 10R come in contact with the contact surface 18 taking the shape of the adjacent engine 4 in the vehicle. Therefore, as the load in a collision is stably transmitted to the engine 4 that is hard and large in mass, it is possible to efficiently improve the effect of distributing and reducing the load in a collision.

Further, the contact portion 14 is the hat-shaped steel member 12 on the surfaces of the front side members 10L and 10R, the hat-shaped steel member 12 is recessed inward from the front side members 10L and 10R along the polygonal-curved portion 17 in a normal state, and the hat-shaped steel member 12 protrudes outward from the front side members 10L and 10R along the polygonal-curved portion 17 and the contact portion 18 is formed when the front side members 10L and 10R are bent by load. Therefore, the contact portion 14 where the contact surface 18 is surely formed can be implemented in a simple structure.

Figure 13:
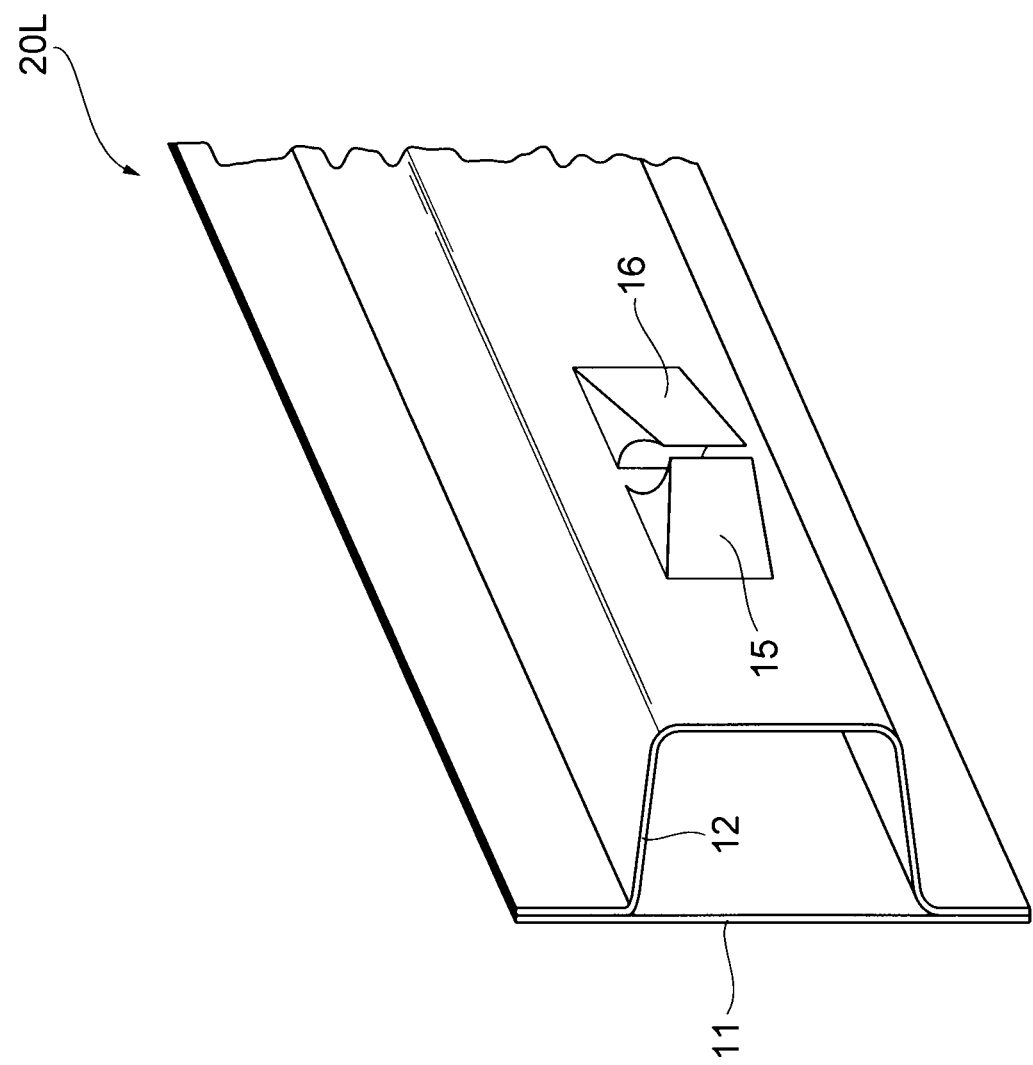
FIG. 13 is a perspective view showing a rear side member according to a second embodiment.

Hereinafter, a second embodiment of the present invention is described. In the following second embodiment, an example of applying a vehicle framework member of the present invention to a rear side member that forms the frame of the sides edges of the rear of the vehicle is described. As shown in FIG. 13, left side rear side member 20L seen from the outside of a vehicle to the center portion of the vehicle is described. The rear side member 20L is implemented by combining a flat steel member 11 inside the vehicle and a hat-shaped steel member 12 outside the vehicle.

Figure 15:
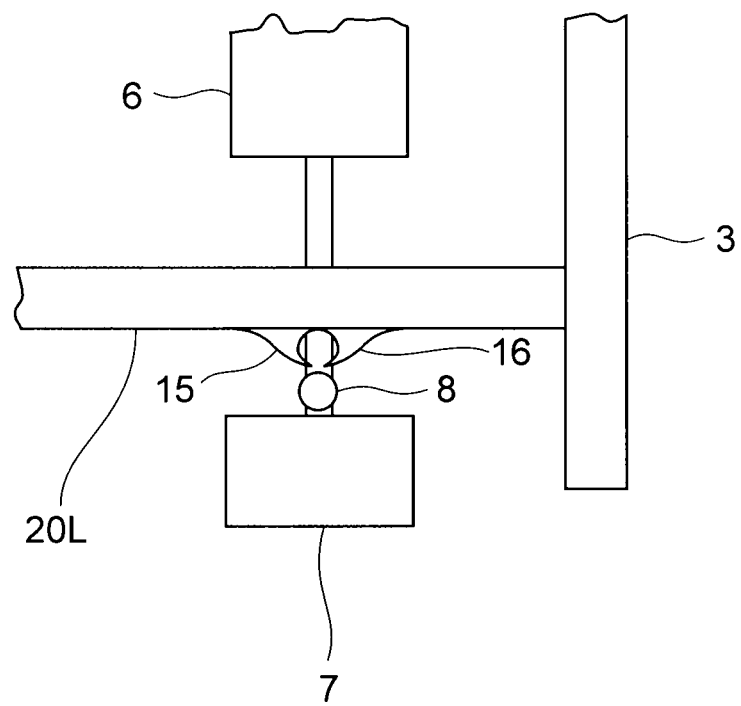
FIG. 15 is a plan view showing a rear side member of the second embodiment in a normal state.

A pair of contact members 15 and 16 are bonded to the hat-shaped steel member 12. As shown in FIG. 15, the contact members 15 and 16 are provided around a suspension member 8 of the tire 7 of the left rear wheel. The suspension member 8 is a cylindrical member suspending the tire 7. The rear side member 20L around the contact members 15 and 16 is different in plate thickness, material, and shape from the other portions. Therefore, the rear side member 20L around the contact members 15 and 16 is smaller in cross-sectional rigidity and weaker than other portions, such that it is easily bent by front-rear load.

Figure 14:
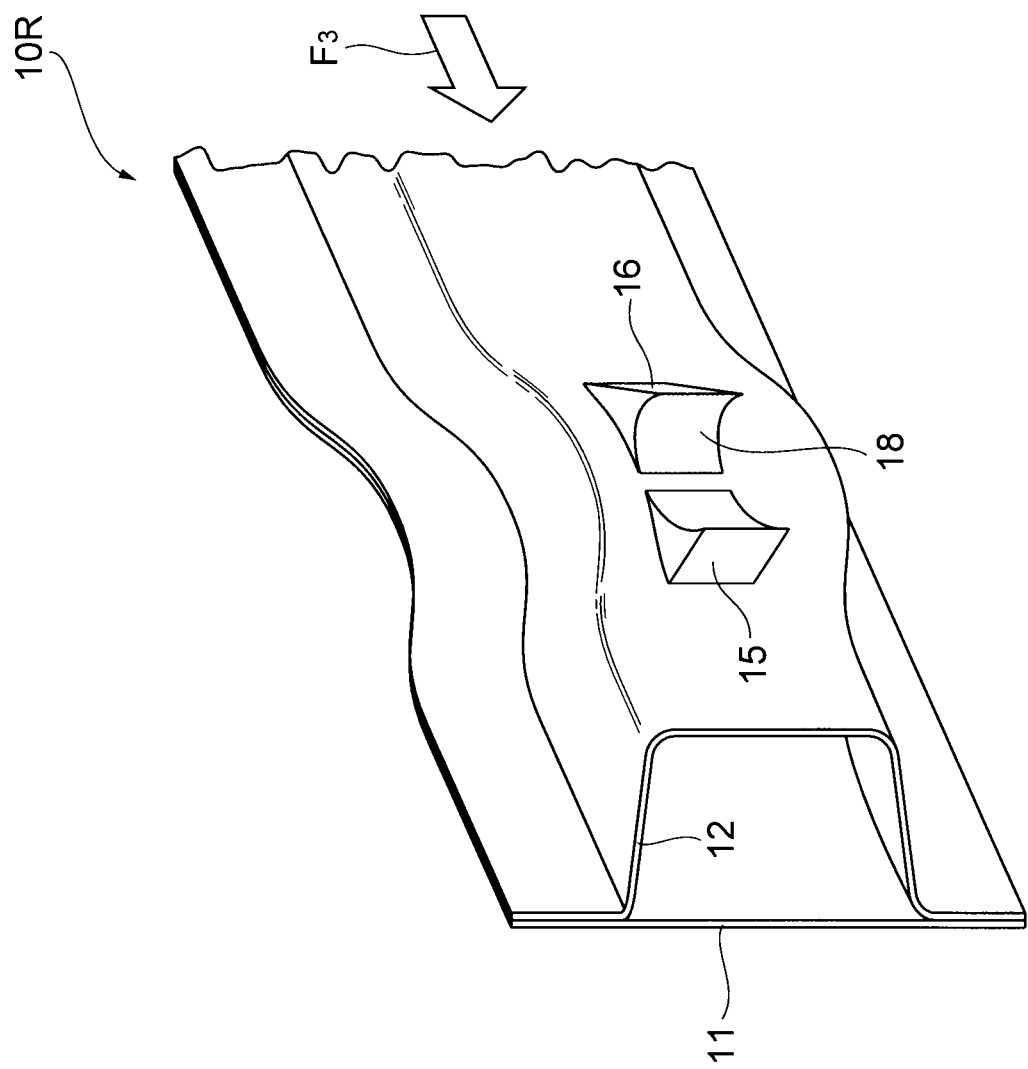
FIG. 14 is a perspective view showing a state in a collision of FIG. 13.

Hereafter, the operation of the rear side member 20L according to the embodiment is described. As shown in FIG. 14, when load $F_3$ is transmitted from the rear of a vehicle by a collision at the rear of the vehicle, the rear side member 20L bends outside the vehicle around the contact members 15 and 16. Tension is applied to the hat-shaped steel member 12 at the outside of the bending, such that the contact members 15 and 16 are developed outward from the rear side member 20L and a member contact surface 18 is formed along the cylindrical shape of the suspension member 8.

Figure 16:
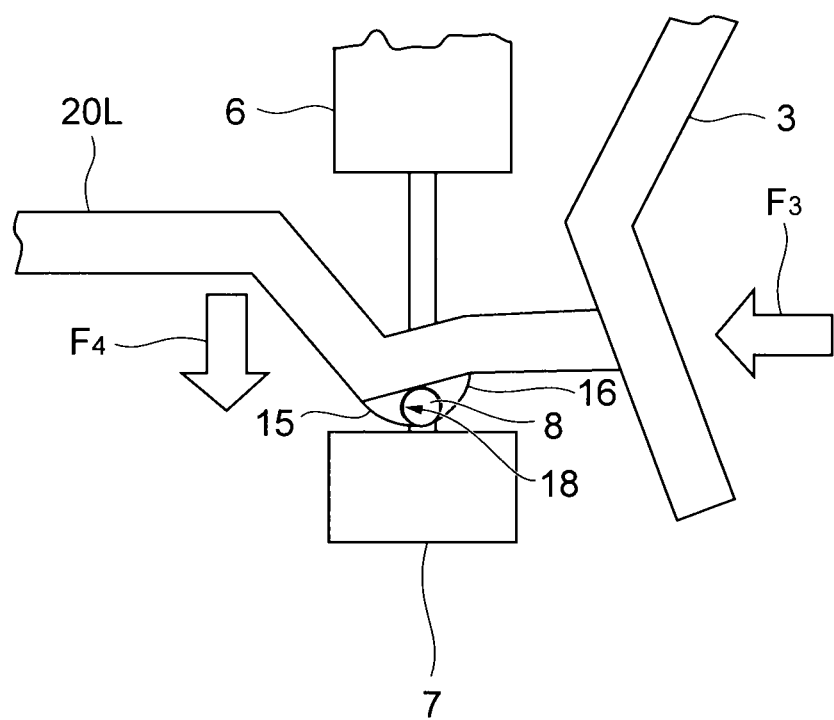
FIG. 16 is a plan view showing a state in a collision of FIG. 15.

As shown in FIG. 16, when the load $F_3$ due to a collision is transmitted from the rear of the vehicle, the bent rear side member 20L comes in contact with the curved surface taking the shape of the member of the adjacent suspension member 8, in the contact surfaces 18 formed at the contact members 15 and 16. As a result, the contact between the bent rear side member 20L and the engine 4 becomes stable. Therefore, load $F_4$ that is a portion of the load $F_3$ from the rear side member 20L is stably transmitted to the suspension member 8. Further, the amount of bending of the rear side members 20L and 20R is set such that the distance changing until the rear side members 20L and 20R come in contact with the adjacent member, such as the suspension member 8, after the rear side members 20L and 20R bend.

Further, when the shape of the member, such as the suspension member 8 of the vehicle, around the contact members 15 and 16 is not a simple cylindrical shape or a curved surface, a concave-convex portion that allows the shapes of the front side member 10R and the contact members 15 and 16 after the deformation due to load $F_3$ to fit to the shape of the suspension member 8 before the deformation can be formed.

According to the embodiment, the contact surface 18 that is the curved surface coming in contact with the cylindrical suspension member 8 suspending the tire 7 of the vehicle when the rear side members 20L and 20R are bent by load is formed at the contact members 15 and 16. Therefore, load due to a collision is stably transmitted to the suspension member 8 having high strength to suspend the tire 7 of the vehicle, such that that it is possible to efficiently improve the effect of distributing and reducing the load in a collision.

Further, the contact members 15 and 16 are members provided on the surfaces of the rear side members 20L and 20R.

The contact members 15 and 16 are folded in a normal state, and when the rear side members 20L and 20R are bent by load, the contact members 15 and 16 are developed and the contact surface 18 is formed. Therefore, the contact surface 18 can be surely formed in a simple structure.

Although embodiments of the present invention were described above, the present invention is not limited thereto and may be modified in various ways.

Industrial Applicability

According to a vehicle framework member of the present invention, it is possible to efficiently improve the effect of distributing and reducing the load in a collision. Further, it is possible to decrease the possibility of unexpected fracturing of the vehicle framework member.

REFERENCE SIGNS LIST

1: vehicle framework member
2: front bumper reinforcement
3: rear bumper reinforcement
4: engine
5: propeller shaft
6: differential gear
7: tire
8: suspension member
10L, 10R: front side member
11: flat steel member
12: hat-shaped steel member
14: contact portion
15, 16: contact member
17: polygonal-curved portion
18: contact surface
20L, 20R: rear side member

The invention claimed is:

1. A vehicle framework member that forms the frame of a vehicle, comprising:
   a contact portion where a contact surface, which comes in contact with an adjacent member in the vehicle when the vehicle framework member is bent by load, is formed,
   wherein the contact surface, which is a curved surface coming in contact with a cylindrical suspension member that suspends a wheel of the vehicle when the vehicle framework member is bent by load, is formed at the contact portion, and
   wherein the contact surface, which takes on a shape of the adjacent member in the vehicle when the vehicle framework member is deformed by load, is formed at the contact portion.

2. A vehicle framework member that forms the frame of a vehicle, comprising:
   a contact portion where a contact surface, which comes in contact with an adjacent member in the vehicle when the vehicle framework member is bent by load, is formed,
   wherein the contact portion is a plate of the surface of the vehicle framework member,
   wherein the plate is recessed inward from the vehicle framework member along a polygonal-curved line of the plate in a normal state,
   wherein the plate protrudes outward from the vehicle framework member, with respect to the polygonal-curved line of the plate in the normal state, and the contact portion is formed with the contact surface when the vehicle framework member is bent by load, and
   wherein the contact surface, which takes on a shape of the adjacent member in the vehicle when the vehicle framework member is deformed by load, is formed at the contact portion.

3. A vehicle framework member that forms the frame of a vehicle, comprising:
   a contact portion where a contact surface, which comes in contact with an adjacent member in the vehicle when the vehicle framework member is bent by load, is formed,
   wherein the contact portion is a contact member provided on the surface of the vehicle framework member,
   wherein the contact member is retracted in a normal state,
   wherein the contact member is developed and the contact surface is formed when the vehicle framework member is bent by load, and
   wherein the contact surface, which takes on a shape of the adjacent member in the vehicle when the vehicle framework member is deformed by load, is formed at the contact portion.

4. A vehicle framework member that forms the frame of a vehicle, comprising:
   a contact portion where a contact surface, which comes in contact with an adjacent member in the vehicle when the vehicle framework is bent by load, is formed,
   wherein the contact surface, which is a curved surface coming in contact with a cylindrical suspension member that suspends a wheel of the vehicle when the vehicle framework member is bent by load, is formed at the contact portion,
   the contact portion is a contact member provided on the surface of the vehicle framework member,
   wherein the contact member is retracted in a normal state, and
   wherein the contact member is developed and the contact surface is formed when the vehicle framework member is bent by load, and
   wherein the contact surface, which takes on a shape of the adjacent member in the vehicle when the vehicle framework member is deformed by load, is formed at the contact portion.

5. The vehicle framework member according to claim 2, wherein the contact surface, which is a flat surface coming in contact with an engine of the vehicle when the vehicle framework member is bent by load, is formed at the contact portion.

6. The vehicle framework member according to claim 3, wherein the contact surface, which is a flat surface coming in contact with an engine of the vehicle when the vehicle framework member is bent by load, is formed at the contact portion.

7. The vehicle framework member according to claim 1, wherein the vehicle framework member is a side member that extends in the front-rear direction of the vehicle at the sides edges of the vehicle.

8. The vehicle framework member according to claim 2, wherein the vehicle framework member is a side member that extends in the front-rear direction of the vehicle at the sides edges of the vehicle.

9. The vehicle framework member according to claim 3, wherein the vehicle framework member is a side member that extends in the front-rear direction of the vehicle at the sides edges of the vehicle.

10. The vehicle framework member according to claim 4, wherein the vehicle framework member is a side member that extends in the front-rear direction of the vehicle at the sides edges of the vehicle.

* * * * *